Jan. 4, 1966  YOSHIYUKI NOGUCHI  3,226,992
AUTOMATIC SPEED CHANGE GEAR
Filed Dec. 2, 1963

INVENTOR
YOSHIYUKI NOGUCHI
BY Hane and Nydick
ATTORNEYS

United States Patent Office 3,226,992
Patented Jan. 4, 1966

3,226,992
AUTOMATIC SPEED CHANGE GEAR
Yoshiyuki Noguchi, Minami-ku, Yokohama-shi, Japan, assignor to Kabushiki Kaisha Hasegawa Haguruma Tekkojo, Tokyo, Japan, a corporation of Japan
Filed Dec. 2, 1963, Ser. No. 327,189
Claims priority, application Japan, June 18, 1963, 38/30,803
8 Claims. (Cl. 74—200)

This invention relates to and has for its object the provision of an automatic speed change gear or power transmission characterized in that a number of conical discs are rotatably and slidably mounted on a driving shaft and a driven shaft, and between those discs are provided driving rings, each of which is equipped with a support frame provided with a plurality of rollers inwardly or outwardly contacting said driving rings so that by actuating this support frame by proper means, the driving rings are shifted in position in reference to the disc thereby changing the rotation ratio of both shafts so that a stepless or continuous speed change is obtained.

Figure 1:
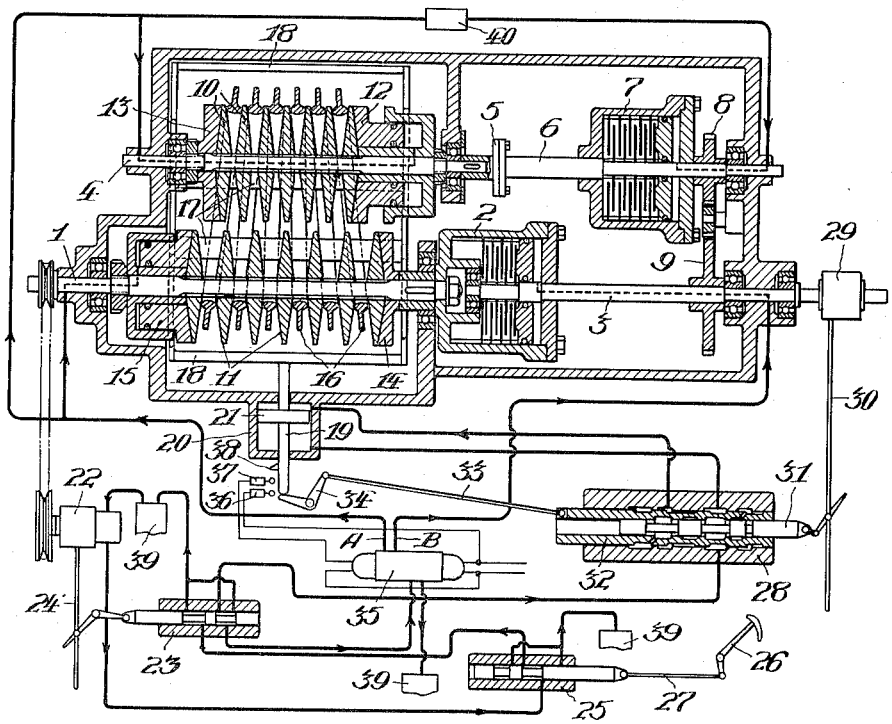
Figure 2:
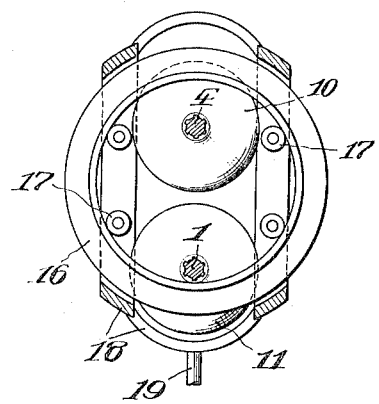

Other objects and advantages of the invention will be apparent from the following description taken in conjunction with the accompanying drawing in which:

FIG. 1 shows a schematic view of the speed change gear and control means therefor, and FIG. 2 shows a vertical cross section of the speed change gear.

A driving shaft 1 is connected with a power out-put shaft 3 through an oil clutch 2. A driven shaft 4 is provided in parallel with the driving shaft 1 and is connected with an intermediate shaft 6 through a coupling 5. The shaft 6 is connected by an oil clutch 7 and gears 8 and 9 with the power out-put shaft 3.

On the driving shaft 1 and the driven shaft 4 there are mounted a number of outwardly tapered or cone discs 10, 11 fitted on the shafts so as to rotate in unison with the shafts but being axially slidable thereon. End members 12, 13 and 14, 15 at both ends of the discs 10 and 11 respectively are mounted on the shafts 1, 4 in parallel. One end member on each shaft, for instance 12, 15 are pushed by springs or cams, or as shown in the drawing, by means of oil cylinders and a piston abutting against the respective end member causes each conical disc to effect a pushing action.

Driving rings 16 are located between the discs 10, 11, said rings 16 being supported by being inwardly or outwardly engaged by a plurality of guide rollers 17. The guide rollers 17 are held by a support frame or cage 18 spanning the ends of the discs 10, 11. The support frame 18 is connected to a rod 19 of a piston 21 housed in a cylinder 20. Accordingly, this support frame or cage 18 and the guide rollers 17 are, as shown in FIG. 2, moved upwardly and downwardly by the movement of the piston 21, thereby shifting the position of the driving rings 16 and changing contact positions on the discs 10, 11. Accordingly, a continuous speed change gear is obtained which changes the rotational ratio of the driving shaft 1 and the driven shaft 4.

A hydraulic pump 22 is coupled with the driving shaft 1. A change-over valve 23 operated by a control rod 24 of a governor (not shown) controls the hydraulic pump 22. A change-over valve 25 is operated through a connecting rod 27 by a pedal 26. A servo-valve 28 controls the feeding of oil under pressure to both sides of the piston 21. The plunger 31 of valve 28 is actuated by the control rod 30 of a governor 29 provided on the power shaft 3. A sleeve valve 32 provided on the outer periphery of the plunger 31 is connected with a connecting rod 33 which is connected to one end of a lever 34, the other end of which engages the lower end on the piston shaft 19 of the afore-mentioned support frame 18. A solenoid operated valve 35 for changing the feeding of oil under pressure to passages A, B is connected by switches 36, 37 with a power source. The switches 36, 37 are so arranged as to operate when engaged by a contact 38 on the piston shaft 19 and constructed so that they do not remain at a neutral position.

Numerals 39 in the drawings show separately the same oil tank. This oil tank 39, hydraulic pressure pump 22, the valves and also all working parts are arranged with pipings as shown in the drawings. Numeral 40 shows a throttle valve.

In the shown position of the change-over valve 23 the oil under pressure from the pump 22 flows to the oil tank 39 and further to the servo-valve 28 and the solenoid operated valve 35 by the action of the rod 24.

The driving shaft 1 is driven by a suitable engine and transmission means. When the engine rotates at a low speed, the rod 24 of the governor of the hydraulic pump 22 is inoperative, so that the oil under pressure flows freely through the change-over valve 23, and the oil clutches of the continuous speed change gear rotate freely. Upon reaching a certain rotation due to an increase of the engine rotation, the governor of the pump 22 operates, the rod 24 is actuated, and the servo-valve 23 operates to feed the oil under pressure from the pump 22 into the change-over valve 25 and the servo-valve 28. The oil under pressure passes from the solenoid operated valve 35 through the passage A. The end member 15 on the driving shaft 1, the end member 12 and clutch 7 of the shaft 6 are then actuated, and the gears 8 start to revolve and thus the power out-put shaft 3 is rotated by the gear 9. The continuous speed change gear starts at a position shown in the drawings of a maximum reduction speed and the shaft 3 revolves. When the engine is further accelerated the piston 21 of the shaft 19 of the support frame 18 is displaced and stabilized in response to the setting of the governor 24 by the action of the servo-valve 28 operated by the rod 30 of the governor 29 of the shaft 3. If the shaft 3 is accelerated further and becomes equal in speed to that of the driving shaft 1, the shaft 19 moves to cause its contact 38 to engage the switch 37 to actuate. By this action, the solenoid valve 35 operates to close the passage A and to open the passage B, and therefore the continuous speed change gear revolves idle and also the clutch 7. The clutch 2 is now operated by the pressure supplied through passage B whereby the driving shaft 1 and the power output shaft 3 are connected directly.

When the rotation of the power out-put shaft 3 exceeds a predetermined rotational speed, the shaft 19 operates the switch 36, and thereby the continuous speed change gears and the hydraulic clutch 7 operate, and in a state of over driving, the driving shaft 1 is rotated.

By operating the pedal 26, the oil passage through the entire hydraulic system is interrupted due to the pedal controlling the change-over valve 25 which is connected to oil supply 39. If the pedal 26 is provided on a vehicle, it will be stopped or reduced in its speed.

As mentioned above, according to this invention the hydraulic pump is rotated by means of the driving shaft of the continuous speed change gear, and their rotation and transmission of power are regulated by the hydraulic means, thus to obtain desired rotation. There are obtained also advantages such as economy in the fuel consumption of the engine, easy and rapid acceleration of speed, also long endurance and quick operation.

What I claim is:

1. A stepless power transmission device comprising a driving shaft and a driven shaft mounted spaced apart parallel to each other, a plurality of cone discs mounted on the driving shaft for rotation in unison therewith, a plurality of cone discs mounted on the driven shaft for rotation in unison therewith, a driving ring encircling both said shafts floatingly disposed between each two corresponding discs, said rings being in rotation transmitting engagement with the adjacent cone walls of the discs, and control means coacting with said drive rings for displacing the same transversely of the rotational axes of the shafts to vary the radial distances at which the rings engage the discs thereby correspondingly changing the ratio of transmission between the driving shaft and the driven shaft.

2. A stepless power transmission device comprising a driving shaft and a driven shaft mounted spaced apart parallel to each other, a plurality of cone discs mounted on the driving shaft for rotation in unison therewith, a plurality of cone discs mounted on the driven shaft for rotation in unison therewith, a driving ring encircling both said shafts floatingly disposed between each two corresponding discs, said rings being in rotation transmitting engagement with the adjacent cone walls of the discs, a plurality of guide rollers for each ring supporting the same, a cage supporting said guide rollers, said guide roller cage being displaceable transversely of the rotational axes of said shafts thereby correspondingly varying the radial distances at which the rings engage the discs, and cage control means for displacing said cage in reference to the discs.

3. A stepless power transmission device according to claim 2, wherein said guide rollers engage the peripheries of the discs to support the same.

4. A stepless power transmission device comprising a driving shaft and a driven shaft mounted spaced apart parallel to each other, a plurality of cone discs mounted on the driving shaft axially displaceable but secured against rotation, a plurality of cone discs mounted on the driven shaft axially displaceable but secured against rotation, a floating drive ring encircling both shafts disposed between each two corresponding discs, said discs and said rings being lengthwise displaceable on the shaft into and out of mutual rotation transmitting engagement from the driving shaft to the driven shaft, actuating means for moving said discs and said rings into and out of said motion transmitting engagement, a plurality of guide rollers for each ring supporting the same, a cage supporting said guide rollers, said guide roller cage being displaceable transversely of the rotational axes of said shafts thereby correspondingly varying the radial distances at which the rings engage the discs, and cage control means for displacing said cage in reference to said discs.

5. A stepless power transmission device according to claim 4 and comprising first speed responsive control means controlled by the rotational speed of the driving shaft and controlling said actuating means to operate the same in response to a rotational speed of the driving shaft above a perdetermined value.

6. A stepless power transmission device according to claim 5 and comprising second speed responsive control means controlled by the rotational speed of the driving shaft and controlling said cage control means in response to a rotational speed of the driving shaft above a second predetermined value greater than said first predetermined value.

7. A stepless power transmission device according to claim 6 and comprising a power output shaft, clutch means for coupling said driving shaft and said output shaft, and third speed responsive control means responsive to the rotational speed of the driving shaft, said third control means causing engagement of said clutch means in response to a predetermined rotational speed of the driving shaft greater than said aforementioned speeds.

8. A stepless power transmission device according to claim 7 and further comprising an intermediate shaft, second clutch means for coupling said intermediate shaft with said driven shaft, and transmission means coupling said intermediate shaft with said driving shaft, said second clutch means being controlled by said first speed responsive control means to cause engagement of the second clutch means in response to said first mentioned predetermined rotational speed of the driving shaft.

References Cited by the Examiner
UNITED STATES PATENTS

| | | | |
|---|---|---|---|
| 2,593,510 | 4/1952 | Wildhaber | 74—193 |
| 2,939,345 | 6/1960 | Burns | 74—796 |
| 3,006,206 | 10/1961 | Kelley et al. | 74—190.5 |
| 3,173,312 | 3/1965 | Stockton | 74—796 |

DON A. WAITE, *Primary Examiner.*

LEONARD H. GERIN, *Assistant Examiner.*